United States Patent Office 3,388,101
Patented June 11, 1968

3,388,101
SILICON-CONTAINING POLYURETHANES
Marco Wismer, Gibsonia, Vernon G. Ammons, Glenshaw, and Gerald W. Miller, Pittsburgh, Pa., assignors to Pittsburgh Plate Glass Company, Pittsburgh, Pa., a corporation of Pennsylvania
No Drawing. Filed Oct. 23, 1964, Ser. No. 406,179
2 Claims. (Cl. 260—77.5)

This invention relates to silicon-containing products useful in producing polyurethanes of especially desirable properties and, more particularly, to the polyurethanes produced from such silicon-containing products.

It is known that reaction products of polyether polyols or polyester polyols with isocyanates, when cross-linked with aromatic diamines or polyols, give polymers of high physical strength. These polymers, however, suffer drastic losses in strength at high temperatures, thus making them unsuited for uses in which they may be subjected to stress at elevated temperatures. Also known are polymers produced from silicon compounds containing isocyanato groups attached to the silicon atom. These materials, however, have poor strength properties, even at relatively low temperatures, and are hydrolytically unstable, thereby limiting their utility.

It has now been found that certain reaction products which comprise organosilicon compounds containing active hydrogen atoms as part of a group attached to the silicon through an oxygen atom and having a functionality of greater than two, react with polyisocyanates to produce polyurethanes with outstanding properties, including hydrolytic stability and exceptional strength at elevated temperatures.

These organosilicon reaction products are made by the reaction of an organosilicon compound containing at least one silicon atom and at least two silicon-bonded hydroxyl or alkoxy groups. The remaining valences of the silicon atom can, for purposes of the present invention, be satisfied by any atom or group which results in a stable molecule compatible with the other materials present. The presence of some phenyl groups is desirable, since these have been found to provide greater compatibility, especially in many of the preferred compositions. Reacted with the organosilicon compound is a polyfunctional compound containing at least one alcoholic hydroxyl group and at least one additional active hydrogen-containing group, which may be hydroxyl, amino or mercapto. ("Active hydrogen," as that term is employed herein, refers to active hydrogen atoms as determined by the Zerewitinoff method, i.e., which are reactive with Zerewitinoff reagent.)

The organosilicon compound and polyfunctional alcohol (using this term to refer to the compound or mixture of compounds co-reacted with the organosilicon compound) react through the alkoxy or hydroxyl groups of the polyfunctional alcohol. There is evolved either water, in the case of hydroxyl-substituted organosilicons, or the alcohol corresponding to the alkoxy groups of the organosilicon compound.

The ratio of polyfunctional alcohol to organosilicon can be varied widely, but it is necessary to provide an average of more than two active hydrogen atoms per molecule in the reaction product, and preferably an average of at least three. This requires a ratio of reactants and extent of reaction depending both upon the number of active hydrogen atoms of the polyfunctional alcohol and the number of reactive hydroxyl and/or alkoxy groups in the organosilicon compound employed. If the reaction product has an average of two or less than two active hydrogen atoms per molecule, it is of little or no usefulness in producing polyurethanes as described below, such products providing polyurethanes of relatively low strength at high temperatures and of otherwise less desirable properties.

Other than the minimum ratio of reactants as defined above, the conditions of the reaction are not critical, although moderate temperatures are usually used to provide a more satisfactory rate of reaction and, in some cases, ester interchange catalysts such as tetraalkyl titanates are utilized. Admixing of the reactants with heating to a temperature above the boiling point of the evolved co-product is generally employed, but excessively high temperatures should be avoided to present discoloration or other deleterious effects.

The nature of the organosilicon reaction product is not fully understood. It is known, however, that the active hydrogen-containing groups are not directly attached to the silicon atoms, but are part of groups of the structure —OX, where X is a substituted hydrocarbon radical derived from the polyfunctional compound and containing at least one active hydrogen atom. It appears that the organosilicon molecule is generally also modified in other respects, because even though the expected amount of evolved alcohol or water is obtained, analysis of the reaction product indicates the presence of free polyfunctional alcohol not containing silicon.

However, in producing polyurethanes from the reaction product, it has been found that the presence of free polyfunctional alcohol is often desirable, and thus it need not be removed.

The organosilicon compound employed to produce the reaction product can be of varying types. For example, substituted silanes, organosilanols and organosiloxanes can all be employed, as can the corresponding cyclic compounds, e.g., cyclosilanes. One preferred class of organosilicon compounds are the alkoxy or hydroxyl-substituted organosiloxanes, siloxanes being considered as compounds having at least one

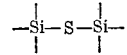

linkage. These can be of differing structures including, for example, cyclic organosiloxanes such as those of the structure:

(I)
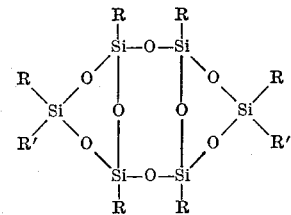

A more preferred class of siloxanes have the structure:

(II)
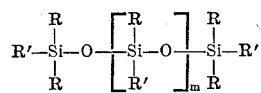

Also, a desirable class of organosilicon compound included herein are substituted silanes of the structure:

(III)
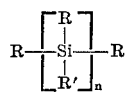

The groups designated by R in the above formulae can be alkyl or alkoxy of 1 to 4 carbon atoms, such as methyl, ethyl, propyl or butyl, or methoxy, ethoxy, propoxy or butoxy. They can also be aryls, such as phenyl or tolyl. In the case of the substituted silanes, at least one R group should be alkyl or aryl. The groups represented by R' are either hydroxyl groups or alkoxy groups, such as ethoxy, methoxy, propoxy, butoxy, or the like. In Formula II, which illustrates the preferred class of organosiloxanes, the value of $m$ can be from 0 to about 20, and in Formula III, the value of $n$ can be from 1 to about 3. When $n$ is 1, at least one of the R groups should be alkoxy.

The organosilicon compounds mentioned do not constitute all the compounds of this type that can be utilized, but are illustrative of the large class of such compounds that can be used and that require only that at least two silicon-bonded hydroxyl or alkoxy groups be present.

The polyfunctional alcohol can be any organic compound having at least one alcoholic hydroxyl group and at least one other active hydrogen-containing functional group, as described above. Polyols are preferred, but substituted alcohols having, for example, amino or mercapto groups can also be utilized.

Among the numerous polyols which can be employed to produce hydroxyl-containing reaction products are included aliphatic polyols, aralkyl polyols, alicyclic polyols, polyether polyols, polyester polyols, and, in general, any polyol containing a plurality of alcoholic hydroxyl groups.

Some specific examples of polyols which are employed are ethylene glycol, propylene glycol, 1,3-butanediol, 1,4-butanediol, glycerol, trimethylolethane, trimethylolpropane, hexamethylene glycol, pinacol, hexanetriol, erythritol, pentaerythritol, para-xylenediol, 1,4-cyclohexanedimethanol, mannitol, and other polyhydroxy alcohols having, for example, 2 to 10 hydroxyl groups and 2 to 20 carbon atoms. Trimethylolpropane, alone, or in combination with other polyols, is a preferred polyol, having been found to give products of desirable properties.

Various polyether polyols are among those that may be utilized, examples being the poly(oxyalkylene) polyols, e.g., the polyoxypropylene adducts of trimethylolpropane known as Pluracols; one such material is known as Pluracol TP-440 and has a hydroxyl number of 400 and a molecular weight of 425.

The reaction products herein can also be made from polyester polyols, such as that produced from phthalic anhydride and 2 moles of trimethylolpropane and having a hydroxyl number of 540 and a molecular weight of 416, or from resinous polyols, such as homopolymers of allyl alcohol, methallyl alcohol, or other unsaturated alcohols, or copolymers of such alcohols with styrene, acrylonitrile, or other ethylenic monomers.

Similarly, other polyfunctional alcohols containing in addition to a hydroxyl group, one or more other functional groups such as amino or mercapto can be employed. These include aminoalcohols, for example, ethanolamine, diethanolamine, propanolamine, isopropanolamine, diisopropanolamine, and butanolamine, and thioalcohols such as mercaptoethanol, 1-mercapto-2-propanol, 1-mercapto-2-butanol, and the like.

By varying the number of active hydrogen-containing atoms on the polyfunctional alcohol (as by employing a mixture of polyols), the number of reactive hydroxyl or alkoxy groups on the organosilicon compound, and the extent of reaction between these, the functionality of the resultant product can be varied from slightly more than 2 to 8, 10, 12 or more. Functionality, as that term is employed herein, refers to the average number of active hydrogen atoms per molecule in the reaction product, based upon the total number of active hydrogens in the reactants and the amount of water or alcohol evolved, which is taken as indicating the extent of reaction. In this connection, it has been found that only one group of the polyfunctional alcohol tends to react, even though an excess of reactive sites on the organosilicon compound is present. Thus the reaction of 3 moles of pentaerythritol with 1 mole of dimethyltriphenyltrimethoxytrisiloxane, with the evolution of 3 moles of methanol, gives a reaction product with a functionality of 9.

A mixture of polyfunctional alcohols can be employed to attain the desired functionality. For instance, the product of the reaction of 2 moles of a 4 to 1 molar mixture of 1,4-butanediol and trimethylolpropane with 1 mole of dimethyltriphenyltrimethoxytrisiloxane, with the evolution of 2 moles of methanol, is considered to have a functionality of 2.4.

As mentioned above, the herein described reaction products are of particular utility in producing polyurethanes having exceptional high temperature strength, as well as other desirable properties. Such polyurethanes are produced by reacting the above organosilicon reaction products with an organic polyisocyanate, which can be a hydrocarbon polyisocyanate, an isocyanato-terminated "prepolymer," or any other organic compound containing two or more isocyanate groups, and which can be a mixture of such compounds.

Among the hydrocarbon polyisocyanates that can be utilized are aromatic, aliphatic and cycloaliphatic diisocyanates and triisocyanates, as well as combinations of these types. Representative hydrocarbon polyisocyanates include 2,4-tolylene diisocyanate, m-phenylene diisocyanate, 4-chloro-1,3-phenylene diisocyanate, 3,3'-dimethyl-4,4'-diphenylene diisocyanate, 4,4'-diphenylene diisocyanate, 1,5-naphthylene diisocyanate, 1,4-tetramethylene diisocyanate, 1,6-hexamethylene diisocyanate, 1,10-decamethylene isocyanate, 1,4-cyclohexylene diisocyanate, 4,4'-methylenebis(cyclohexyl isocyanate), 1,5-tetrahydronaphthylene diisocyanate, p-xylylene diisocyanate, durene diisocyanate and 1,2,4-benzene triisocyanate.

The polyisocyanates may contain other substituents, although, in general, those which are free from reactive groups other than the isocyanato groups are ordinarily preferred. Dimers and trimers of monomeric diisocyanates, and di(isocyanato-aryl)ureas, such as di(3-isocyanato-4-methylphenyl)urea, may also be used.

Particularly useful organic polyisocyanates are the so-called "prepolymers" in which a polyisocyanate is modified through partial reaction with a polyhydroxy compound or other compound having two or more active hydrogen atoms, to provide an isocyanato-terminated product that is easily handled and employed in the above reaction. The organic polyisocyanates used to prepare such prepolymers include any of the various compounds discussed above.

While any polyfunctional active hydrogen-containing compound, such as those mentioned above, can be used to prepare prepolymers suitable for use herein, especially desirable are isocyanato-terminated adducts of an organic polyisocyanate and a polyester polyol or a polyether polyol. These include the isocyanato-terminated adducts of various saturated and unsaturated polyester polyols made by esterification of polyols and dibasic acids, such as that formed from the reaction of tolylene diisocyanate with a polyester formed from propylene glycol and adipic acid. Such polyester adducts are well known and are utilized in the manufacture of conventional types of polyurethanes.

Other organic polyisocyanates of particular utility herein include the prepolymers which are isocyanato-terminated polyether adducts of an organic polyisocyanate and a polyether polyol. These are similar to the polyester adducts, except that they include ether linkages rather than ester groups. They are also well known and extensively used. Examples of these are reaction products of diisocyanates with polyether polyols produced from the reaction of alkylene oxide and polyhydric compounds, such as sorbitol, pentaerythritol, glycerol, sucrose, and the like. A preferred class of polyether adducts for use in the present invention includes those made from tolylene diisocyanate and poly(oxytetramethylene)glycol. Prepolymers of this class are commercially available.

The reaction between the silicon-containing condensation product and the organic polyisocyanate does not require any special conditions. For optimum properties of the product, it is best to employ stoichiometric or nearly stoichiometric ratios of isocyanato groups to active hydrogen in the reaction product; the ratios employed are generally between 0.9 and 1.1 to 1. The reaction takes place upon admixing the reactants and is relatively slow at room temperature, so that moderate heating, e.g., to about 100° F., is usually employed.

The cured products thus obtained are of high strength and have exceptional strength retention at very high temperatures, e.g., 350° F. to 400° F. and higher. Further, they are excellent, hard, tough elastomers which are useful in products which may be subjected to high temperatures, such as laminates for oven or furnace doors, gaskets for internal combustion or steam engines, and other similar uses. By carrying out the reaction with polyisocyanate utilizing ordinary foam-producing procedures, polyurethane foams of desirable properties are obtained, for example, heat resistant rigid foam, useful for insulation and like applications.

Polyurethane elastomers are in many instances cast into the desired shape or form, and the present compositions are particularly applicable to such procedures. Such castings are made, for example, by heating and mixing the organosilicon reaction product and the organic polyisocyanate, and then pouring the mixture into the mold or other casting site and allowing the composition to cure. If relatively thick castings are to be made, or if bubble-free products are desired, it is advantageous to "degas" the mixture prior to casting, as by heating at subatmospheric pressure.

The invention will be further described by reference to the following examples. These examples are illustrative and should not be construed so as to limit the invention to their details. All parts and percentages are by weight unless otherwise specified.

Where toluene diisocyanate is employed in the examples, there was used the ordinary mixture of 80 percent 2,4-isomer and 20 percent 2,6-isomer. In several of the examples there are employed certain prepolymers produced from poly(oxytetramethylene) glycols and toluene diisocyanate, which have the following approximate structure:

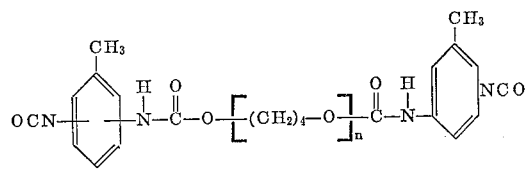

For convenience, the prepolymer of the above type which has a molecular weight of about 1302 (i.e., where $n$ equals about 13), and which is produced from poly(oxytetramethylene)glycol with a molecular weight of about 954, is termed Prepolymer A. It has an isocyanate (NCO) content of about 6.40 percent. The corresponding prepolymer which is termed Prepolymer B, has a molecular weight of about 870 ($n$ equals 7) and is produced from poly(oxytetramethylene)glycol having a molecular weight of about 522. Its NCO content is about 9.34 percent.

EXAMPLE 1

(a) Preparation of organosilicon reaction product

A glass reaction vessel fitted with thermometer, condenser, stirrer, azeotropic distillation trap and inert gas inlet was charged with 402 parts (3.0 moles) of trimethylolpropane and 470 parts (1.0 mole) of dimethyltriphenyltrimethoxytrisiloxane. While sparging with inert gas, this mixture was heated slowly with stirring for 2 hours and 20 minutes, during which time the temperature reached 115° C. During the heating, the evolved methanol was continuously removed in the azeotropic distillation trap. A total of 94.4 parts of methanol were obtained, compared to the expected 96 parts. The hydroxyl value of the product was 416.5.

(b) Preparation of polyurethane

A mixture of 60 parts of Prepolymer A and 40 parts of Prepolymer B was degassed by heating at 200° F. with stirring and at 2 millimeters pressure for 1½ hours. To this there were added 24.0 parts of the reaction product made above, and the resultant mixture was degassed for an additional 5 minutes. The hot mixture was poured into two casting cells, one being an aluminum cup. The other casting cell was made from one sheet of polytetrafluoroethylene (Teflon) and one sheet of glass spaced 60 mils apart and sealed at the edges with polyethylene terephthalate tape, the glass being coated with a silicone release agent. The castings were then cured for 6 hours at 285° F., removed from the cells and tested for hardness using the Shore durometer hardness test (ASTM D1706–61), and for tensile strength using an Instron Tester (ASTM D628–61T). Elongation was also measured. It was found that at room temperature the polyurethane product had a tensile strength of 3060 pounds per square inch with an elongation of 325 percent and a Shore "A" hardness of 70 to 72. At 365° F. its tensile strength was 203 pounds per square inch and elongation was about 50 percent, and its Shore "A" hardness was 55 to 58. After as long as 8 hours at 365° F., the only visible change in the open casting was the appearance of a thin, amber-colored layer on the open face.

The foregoing results illustrate the exceptional strength retention of the elastomers of this invention at elevated temperatures. Thus, for example, compared to the product obtained by curing the same mixture of prepolymers with a 10:1 ratio of 1,4-butanediol and trimethylolpropane, one of the best conventional elastomers of this type, the silicon-containing polyurethane had a somewhat lower tensile strength at room temperature, but had about twice the strength of the conventional material at 365° F.

EXAMPLE 2

(a) Preparation of organosilicon reaction product

Using a procedure similar to that of Example 1, a mixture of 68.1 parts of diphenyldiethoxysilane and 67 parts of trimethylolpropane was heated to 189° C. over a 10-hour period. There were obtained a total of 27 grams of ethanol during the reaction and the product obtained had a hydroxyl value of 558.

(b) Preparation of polyurethane

A mixture of 10 parts of Prepolymer B and 15 parts of Prepolymer A was heated to 100° C. and degassed for 3 to 4 minutes. There were then added 4.5 parts of the organosilicon reaction product produced above and this mixture was degassed for 1 to 2 minutes, poured into an aluminum dish and degassed for an additional 1 to 2 minutes. It was then cured at 280° F. for 2 hours. The casting produced was clear, yellow and bubble-free. It had a Shore "A" hardness of 67, and after heating at 365° F. for 6 hours had a Shore "A" hardness of 35 at that temperature.

EXAMPLE 3

(a) Preparation of organosilicon reaction product

Following the procedure of Example 1, a mixture of 80.1 parts of phenyltriethoxysilane and 134 parts of trimethylolpropane was reacted by heating to 165° C. over 1 hour and 40 minutes. A total of 46 parts of ethanol was evolved and the product obtained had a hydroxyl value of 768.

(b) Preparation of polyurethane

Using the procedure of Example 2(b) above, a casting was produced from a mixture of 10 parts of Prepolymer B, 15 parts of Prepolymer A, and 3.3 parts of the reaction product produced in (a) above. The casting was again clear, yellow and bubble-free, and had a Shore "A" hardness of 72 at room temperature and 55 at 400° F. After 13 hours at 365° F., it still had a Shore "A" hardness of 50 at 365° F.

EXAMPLE 4

(a) Preparation of organosilicon reaction product

A reaction vessel was charged with 732 parts of Pluracol TP-740, 300 parts of xylene, and 436 parts of a cyclic organosiloxane, the organosiloxane corresponding to Formula I above, with R representing phenyl and R' hydroxyl. Pluracol TP-740 is a propylene oxide adduct of trimethylolpropane, having a hydroxyl value of 230 and an equivalent weight of 244. This mixture was heated to 130° C. with stirring and sparging with inert gas, and then further heated to 156° C. over a 2-hour period. The water evolved was removed by azeotropic distillation. After the reaction, the xylene and any residual water were distilled off, leaving a product having a hydroxyl value of 140.2.

(b) Preparation of polyurethane

A mixture of 60 parts of Prepolymer B and 90 parts of Prepolymer A was heated to 100° C. and degassed at 1 millimeter pressure for 10 minutes. There were then added 108 parts of the above organosilicon reaction product and after degassing for 3 minutes at 1 millimeter pressure, this mixture was poured into a glass mold and cured for 6 hours at 285° F. The casting obtained had a Shore "A" hardness of 55 at room temperature and 26 at 365° F. after 4 hours at this temperature. Its tensile strength was 111 pounds per square inch at 365° F.

EXAMPLE 5

An organosilicon reaction product was produced by mixing and heating 53.6 parts of trimethylolpropane, 0.3 part of tetrabutyl titanate and 240 parts of octamethyloctaphenyldimethoxyoctasiloxane. Heating was carried out for 3 hours at a maximum temperature of 150° C., during which time 15.2 parts of methanol were evolved and removed. The product, which had a hydroxyl value of 156.3, was employed in producing a polyurethane as in Example 1(b). A comparable casting was obtained having a tensile strength of 135 pounds per square inch at 365° F.

EXAMPLE 6

Substantially similar results to those above were obtained by substituting for the organosilicon reaction products of the above examples the product of 5 moles of trimethylolpropane per mole of phenyldimethylpentamethoxytrisiloxane, having a hydroxyl value of 660.6.

EXAMPLE 7

Dimethyltriphenyltrimethoxytrisiloxane was partially hydrolyzed by refluxing a mixture of 200 parts of the siloxane, 3.3 parts of water, 3.3 parts of methanol, and 1 part of glacial acetic acid. The product had a methoxy content (Zeisel procedure) of about 15 percent. A mixture of 207 parts of the partially polymerized siloxane and 134 parts of trimethylolpropane was heated for 2 hours at a maximum temperature of 197° C. to produce an organosilicon reaction product having a hydroxyl value of 362.6. During the reaction, there were removed 41 parts of methanol. Example 1(b) was repeated with this reaction product substituted for the organosilicon reaction product therein. The casting produced had a Shore "A" hardness of 65 at room temperature and 47 at 365° F.; its tensile strength at 365° F. was 165 pounds per square inch.

EXAMPLE 8

An organosilicon reaction product as in Example 1(a) was reacted with a polyester polyol prepolymer prepared from a polyester made from 1.0 mole of adipic acid and 1.8 moles of 1,4-butanediol and having a hydroxyl value of 201.3 and an acid value of 4.19. The prepolymer was made from toluene diisocyanate, using 2 equivalents per equivalent of polyester. Castings were made and tested as before. The casting had a tensile strength of 210 pounds per square inch at 365° F., and had more than six times the strength at this temperature than did a polyurethane made from the same prepolymer and a conventional 1,4-butanediol-trimethylol-propane curing system.

EXAMPLES 9 TO 17

These examples were carried out in the manner of the above examples. Dimethyltriphenyltrimethoxytrisiloxane and various polyfunctional alcohols were reacted to produce organosilicon reaction products of different types and having varying functionalities, and these were then reacted with an organic polyisocyanate. An equal amount of isocyanate and active hydrogen on an equivalent basis was employed in each instance. The products were tested for Shore "A" hardness as above. The data are shown in Table I.

TABLE I

| Example | Polyfunctional Alcohol | Moles | Functionality | Organic Polyisocyanate | Shore "A" Hardness 77° F. | Shore "A" Hardness 285° F. |
|---------|-----------------------|-------|---------------|------------------------|--------|--------|
| 9 | 1,4-butanediol | 3 | 3 | Prepolymer B | 61 | 30 |
| 10 | do | 3 | 3 | Toluene diisocyanate | 93 | 25 |
| 11 | Trimethylolpropane | 3 | 6 | Prepolymer B | 96 | 65 |
| 12 | Cyclohexanedimethanol / Trimethylolpropane | 2 / 1 | 4 | do | 94 | 58 |
| 13 | p-Xylenediol / Trimethylolpropane | 1 / 2 | 5 | {60 parts Prepolymer A / 40 parts Prepolymer B} | 66 | 58 |
| 14 | Sorbitol polyether[1] | 3 | 15 | {60 parts Prepolymer A / 40 parts Prepolymer B} | 72 | 65 |
| 15 | Sucrose polyether[2] | 2.2 | 15.5 | {60 parts Prepolymer A / 40 parts Prepolymer B} | 82 | 70 |
| 16 | 2-amino-1-propanol | 3 | 6 | Toluene diisocyanate | 90 | 25 |
| 17 | 2-mercaptoethanol | 3 | 3 | {60 parts Prepolymer A / 40 parts Prepolymer B} | 42 | 10 |

[1] Reaction product of 1 mole of sorbitol and 10 moles of propylene oxide, hydroxyl value 460, average molecular weight 762.
[2] Reaction product of 1 mole of sucrose and 11.5 moles of propylene oxide, hydroxyl value 497, average molecular weight 902.

Polyurethanes can also be produced in accordance with the invention herein by making a prepolymer of the organosilicon reaction product, that is, by reacting an excess of polyisocyanate with the organosilicon reaction product to produce an isocyanate terminated product, and then reacting this product with an active hydrogen containing compound. This embodiment is illustrated by the following examples.

EXAMPLE 18

One mole of dimethyltriphenyltrimethoxytrisiloxane was reacted with 2.5 moles of 1,4-butanediol in the manner described above. One equivalent of this organosilicon reaction product (hydroxyl value 236.3) was added to 1 mole of toluene diisocyanate over a period of 5 minutes while maintaining the temperature at about 80° C., and the mixture was stirred for 4 hours. The prepolymer obtained had an isocyanate equivalent weight of 398.4. A polyurethane casting was produced by reacting one equivalent of the prepolymer was one equivalent of the above organosilicon reaction product (hydroxyl value 236.3), using the procedure of the above examples. The casting obtained after curing at 285° F. for 6 hours had a Shore "A" hardness of 84 at 77° F. and 30 at 285° F.

EXAMPLE 19

Example 18 was repeated, except that in place of the added organosilicon reaction product, 1,4-butanediol was employed along with the prepolymer in making the polyurethane casting. The cured product had a Shore A hardness of 35 at 285° F.

The invention has been described above chiefly with reference to polyurethane elastomers, since these utilize the advantages of the present products to a high degree. However, the organosilicon reaction products herein can also be employed in making polyurethane foams of highly desirable properties. These are produced using the conventional techniques employed in making such foams, utilizing the above organosilicon reaction products and organic polyisocyanates along with any of the known gassing agents, catalysts, emulsifiers, and the like. The making of such foams is illustrated by the following examples.

EXAMPLE 20

An organosilicon reaction product was made from dimethyltriphenyltrimethoxytrisiloxane and a sorbitol polyether as in Example 14. A mixture of 153 parts of this reaction product, 1.0 part of a silicone emulsifying agent (Dow Corning L-5310), 1.14 parts of dimethylethanolamine, 0.46 part of triethylenediamine, and 43 parts of trichlorofluoromethane was blended at 60° F. and 101 parts of crude tolylene diisocyanate containing about 15 percent polymeric isocyanate and having a functionality of 2.2 (Nacconate 40 40) were added. The mixture was stirred for 15 seconds and allowed to foam at room temperature. The resin began cellulation in 40 to 45 seconds and visibly gelled in 125 to 130 seconds. It was non-friable within one hour and after standing overnight, the foam had a cut density of 2.04 pounds per cubic foot. After 28 hours at 200° F. (dry heat), it had 0-6 percent expansion, only very slight distortion, and no splitting of the foam structure. Upon further heating at 300° F. for 48 hours, no further expansion, shrinkage, distortion or splitting was noted.

EXAMPLE 21

Example 20 was repeated, using as the organosilicon reaction product 141 parts of the organosilicon reaction product employed in Example 15 (made from dimethyltriphenyltrimethoxytrisiloxane and a sucrose polyether). The foam obtained again had excellent properties, with a cut density of 1.68 pounds per cubic foot and heat resistance comparable to the foam of Example 20.

As discussed above, it is necessary that the organosilicon reaction product have a functionality greater than 2, that is, containing an average of more than 2 active hydrogen atoms per molecule in the reaction product. If less than 2 such active hydrogens are present, the condensation product does not produce desirable polyurethanes as described above. This is illustrated by the following examples:

EXAMPLE 22

A series of condensation products were prepared from dimethyltriphenyltrimethoxytrisiloxane reacted with varying amounts of 1,4-butanediol. In each case, the amount of methanol evolved and the hydroxyl number corresponded closely to that expected for a product of the functionality desired. These products were then reacted both with Prepolymer B and toluene diisocyanate, and tested as before. The results are summarized below:

| Polyisocyanate | Functionality | Shore "A" Hardness | |
|---|---|---|---|
| | | 77° F. | 285° F. |
| Prepolymer B | 2 | 38 | (¹) |
| Do | 2.5 | 54 | 10 |
| Do | 3 | 61 | 30 |
| Toluene diisocyanate | 2 | 63 | (²) |
| Do | 2.5 | 96 | 5 |
| Do | 3 | 93 | 25 |

¹ Too soft to measure.
² Liquid.

While the foregoing examples illustrates the invention in several of its embodiments, similar results to those illustrated are attained by employing the various other organosilicon compounds, polyfunctional alcohols, and organic polyisocyanates described herein in place of the corresponding materials of the examples. Also, techniques other than those set forth can be employed; for example, the free polyfunctional alcohol which is often present in the organosilicon reaction products as produced in the above examples can be removed if desired. Similarly, other procedures for making the polyurethanes can be used, such as the making of foams utilizing a prepolymer.

According to the provisions of the patent statutes, there are described above the invention and what are now considered to be its best embodiments. However, within the scope of the appended claims, it is to be understood that the invention can be practiced otherwise than as specifically described.

We claim:
1. A polyurethane produced by reacting an organic polyisocyanate with the reaction product of
   (a) an organosilane of the formula

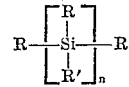

where each R is selected from the group consisting of alkyl and alkoxy of 1 to 4 carbon atoms and aryl, R' is selected from the group consisting of hydoxyl and alkoxy, and $n$ is 1 to 3, and
   (b) a polyol
the average number of active hydrogen atoms per molecule in said reaction product being greater than two.

2. The polyurethane of claim 1 in which said organosilane is phenyltrialkoxysilane.

References Cited

UNITED STATES PATENTS

| 2,917,480 | 12/1959 | Bailey et al. | 260—448.8 |
| 2,932,586 | 4/1960 | Wilson et al. | 260—448.2 |
| 3,032,530 | 5/1962 | Falk | 260—46.5 |
| 3,042,657 | 7/1962 | Dodgson | 260—448.2 |
| 3,054,759 | 9/1962 | Britain | 260—77.5 |
| 3,145,185 | 8/1964 | Remington | 260—77.5 |
| 3,164,557 | 1/1965 | Merten et al. | 260—77.5 |
| 3,179,713 | 4/1965 | Brown | 260—46.5 |
| 3,194,773 | 7/1965 | Hostettler | 260—77.5 |

FOREIGN PATENTS 875,109    8/1961    Great Britain.

DONALD E. CZAJA, *Primary Examiner.*

L. J. BERCOVITZ, *Examiner.*

M. I. MARQUIS, *Assistant Examiner.*

UNITED STATES PATENT OFFICE
CERTIFICATE OF CORRECTION

Patent No. 3,388,101                                 June 11, 1968

Marco Wismer et al.

It is certified that error appears in the above identified patent and that said Letters Patent are hereby corrected as shown below:

Column 2, line 40, "-Si-S-Si-" should read -- -Si-O-Si- --.

Signed and sealed this 30th day of December 1969.

(SEAL)
Attest:

Edward M. Fletcher, Jr.                      WILLIAM E. SCHUYLER, JR.
Attesting Officer                               Commissioner of Patents